US012422527B2

(12) United States Patent
Humphrey et al.

(10) Patent No.: US 12,422,527 B2
(45) Date of Patent: Sep. 23, 2025

(54) TRACKING LASER RANGE FINDER SYSTEM AND METHOD

(71) Applicant: PLX, Inc., Deer Park, NY (US)

(72) Inventors: Malcolm Humphrey, Hicksville, NY (US); Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 1195 days.

(21) Appl. No.: 17/225,281

(22) Filed: Apr. 8, 2021

(65) Prior Publication Data

US 2022/0206122 A1 Jun. 30, 2022

Related U.S. Application Data

(60) Provisional application No. 63/131,252, filed on Dec. 28, 2020.

(51) Int. Cl.
G01S 7/481 (2006.01)
G01S 7/4863 (2020.01)
G01S 17/42 (2006.01)
G01S 17/66 (2006.01)

(52) U.S. Cl.
CPC .......... G01S 7/4817 (2013.01); G01S 7/4863 (2013.01); G01S 17/42 (2013.01); G01S 17/66 (2013.01)

(58) Field of Classification Search
CPC ..................................... G01S 17/42
See application file for complete search history.

(56) References Cited

U.S. PATENT DOCUMENTS

| 4,788,441 | A | 11/1988 | Laskowski |
| 8,654,316 | B1 | 2/2014 | Glennon |
| 2015/0265853 | A1 | 9/2015 | Humphrey |
| 2015/0293228 | A1* | 10/2015 | Retterath ............. G01S 17/931 356/5.01 |
| 2016/0306044 | A1* | 10/2016 | Smits .................... G01S 7/4863 |
| 2018/0284239 | A1* | 10/2018 | LaChapelle ............ G01S 17/10 |
| 2019/0025428 | A1* | 1/2019 | Li ........................... G01S 7/486 |
| 2019/0302264 | A1 | 10/2019 | Smits |
| 2021/0072385 | A1* | 3/2021 | Sandborn ............... G01S 17/95 |
| 2021/0255323 | A1* | 8/2021 | Lundquist ............. G01S 17/89 |

(Continued)

OTHER PUBLICATIONS

International Search Report issued in PCT/US21/72543, mailed Feb. 8, 2022.

(Continued)

Primary Examiner — Yuqing Xiao
Assistant Examiner — Zhengqing Qi
(74) Attorney, Agent, or Firm — ICE MILLER LLP; Safet Metjahic

(57) ABSTRACT

A tracker laser rangefinder for detecting, targeting, locating or tracking an object in real time in a field of view, including a laser source arranged to generate and emit a laser at a first time in response to a laser trigger signal; a fast-scan mirror arranged to deflect and steer the laser to an object in a scan plane; a sensor arranged to receive a reflection of the laser from the object at a second time and output a return laser detection signal; and a controller arranged to receive the return laser detection signal and determine a first angle, a second angle and a range to the object. The angles can be based on a position of the fast-scan mirror and the range can be calculated based on a period of time.

13 Claims, 11 Drawing Sheets

(56) References Cited

U.S. PATENT DOCUMENTS

2022/0075036 A1* 3/2022 Zhou ................... G01S 7/4865

OTHER PUBLICATIONS

Sonnaillon, Maximiliano Osvaldo, and Fabián Jose Bonetto. "A low-cost, high-performance, digital signal processor-based lock-in amplifier capable of measuring multiple frequency sweeps simultaneously." Review of Scientific Instruments 76.2 (2005). (8 pages).

* cited by examiner

TRACKING LASER RANGE FINDER SYSTEM AND METHOD

CROSS-REFERENCE TO RELATED APPLICATION

This application claims priority to and the benefit of provisional U.S. Patent Application No. 63/131,252, titled "Tracking Laser Range Finder," filed Dec. 28, 2020, which is incorporated herein by reference in its entirety.

FIELD OF THE DISCLOSURE

The present disclosure relates generally to optics, electronics, electronic firmware, laser technology and computer resources for detecting, identifying, targeting, tracking or determining a range to an object.

BACKGROUND OF THE DISCLOSURE

Rangefinder technologies are used in various applications to measure distances from observers to targets. For instance, laser rangefinders are commonly used in golf, ballistics, surveying, construction, aircraft guidance, surveillance, and satellite navigation, among many other applications. The technologies typically include laser, LiDAR (light detection and ranging), radar, sonar or ultrasonic range finding components.

While existing rangefinder technologies are typically satisfactory or, in many instances, more than satisfactory for most applications, they can be unsuitable for applications that require fast response times or low latency. For instance, existing rangefinder technologies can be unsuitable for detecting, targeting, tracking or rangefinding of fast-moving objects, such as, for example, projectiles, missiles, or aircraft; or, unsuitable for performing such operations from fast-moving vehicles to detect, target, track or rangefind objects that might be moving or stationary on land, water or in the air.

SUMMARY OF THE DISCLOSURE

The disclosure provides a device, computer-implemented method, and system capable of detecting, targeting, tracking or rangefinding one or more objects. In a non-limiting embodiment of the disclosure, a tracker laser rangefinder is provided for detecting, targeting, locating or tracking an object in real time in a field of view. In an embodiment, the tracker laser rangefinder comprises: a laser source arranged to generate and emit a laser pulse at a first time in response to a laser trigger signal; a fast-scan mirror arranged to deflect and steer the laser pulse to an object in a scan plane; a sensor arranged to receive a reflection of the laser pulse from the object at a second time and output a return pulse detection signal; and a controller arranged to receive the return pulse detection signal and determine a first angle, a second angle and a range to the object. The first angle and the second angle can be based on a position of the fast-scan mirror. The range of the object can be calculated based on a period of time comprising the first time as a start time and the second time as a stop time.

In an embodiment, the sensor comprises an Avalanche photodiode, a silicon photomultiplier or a photomultiplier tube.

In an embodiment, the sensor comprises a quadrant Avalanche photodiode or an IaGaAs Avalanche photodiode.

In an embodiment, the fast-scan mirror comprises a microelectromechanical system (MEMS) device, a voice coil mirror (VCM) or a piezoelectric actuator mirror.

The tracker laser rangefinder can comprise a digital signal processor (DSP) arranged to: filter optical noise; filter electronic noise; reject a false positive signal; increase a signal-to-noise ratio of the reflection of the laser pulse; or generate a time stamp for the reflection of the laser pulse.

In an embodiment, the fast-scan mirror and sensor can be arranged to find and track in real time the object as it moves in the scan plane.

In an embodiment, the controller can comprise a lock-in amplifier that generates amplitude and phase information from combining a reference signal and the return pulse detection signal, and wherein the reference signal is based on sampling an output of a monitor photoreceptor or of the laser trigger signal.

The tracker laser rangefinder can comprise an optical system arranged to collect reflected light pulses in the field of view, including the reflection of the laser pulse from the object.

In an embodiment, the optical system comprises a non-telecentric scan lens and/or an F-Theta lens.

In an embodiment, the optical system is arranged to direct the laser pulse to the object.

The tracker laser rangefinder can comprise a second optical system arranged to direct the laser pulse to any point in the scan plane.

The tracker laser rangefinder can comprise a return fast-scan mirror synchronized to the fast-scan mirror to lock-in and track a point in the scan plane.

In an embodiment, the controller is arranged is arranged to output object location data to a host system, including a timestamp, the first angle, the second angle and the range to the object.

In an embodiment, the controller is arranged to operate in any of a rangefinder mode, a search mode or a tracking mode.

In an embodiment, the tracker laser rangefinder comprises: a laser source arranged to generate and emit a laser pulse at a first time in response to a laser trigger signal; a fast-scan mirror arranged to deflect and steer the laser pulse to an object in a scan plane; a sensor arranged to receive a reflection of the laser pulse from the object at a second time and output a return pulse detection signal; and a controller arranged to receive the return pulse detection signal and generate amplitude and phase information. A reference can be determined by sampling an output of a monitor photoreceptor (MPR) or the laser trigger signal. The amplitude and phase information can be generated from combining the reference and the return pulse detection signal in a lock-in amplifier. A first angle, a second angle and the range of the object can be determined based on a position of the fast-scan mirror and the amplitude and phase information.

In an embodiment, a computer-implemented method is provided for detecting, targeting, locating or tracking an object in real time in a field of view. The method comprises: emitting, by a laser source, a pulsating laser beam having at least one laser pulse; directing, by an optical system, the pulsating laser beam to an object in a field of view; detecting, by a sensor, a reflection of the at least one laser pulse from the object in the field of view; steering, by a fast-scan mirror, the pulsating laser beam to track the object in real-time as it moves in the field of view; and outputting, by a controller, angle information and range information of the object as it moves in the field of view, wherein the angle information and the range information is output continuously in real time. The angle information can include a first angle to the object and a second angle to the object.

In an embodiment, the method comprises: sampling an output of a monitor photoreceptor or a laser trigger signal that drives a laser source to generate the pulsating laser beam; generating a reference based on the sampled laser trigger signal; and combining, by a lock-in amplifier, the reference with a return pulse detection signal from the sensor to generate the angle information and the range information.

In an embodiment, the method comprises digital signal processing a return pulse detection signal from the sensor to filter optical noise, filter electronic noise, reject a false positive signal, or generate a time stamp for the reflection of the at least one laser pulse.

In an embodiment, the method comprises steering, by a return fast-scan mirror, the reflection of the at least one laser pulse in synchronization with the fast-scan mirror.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
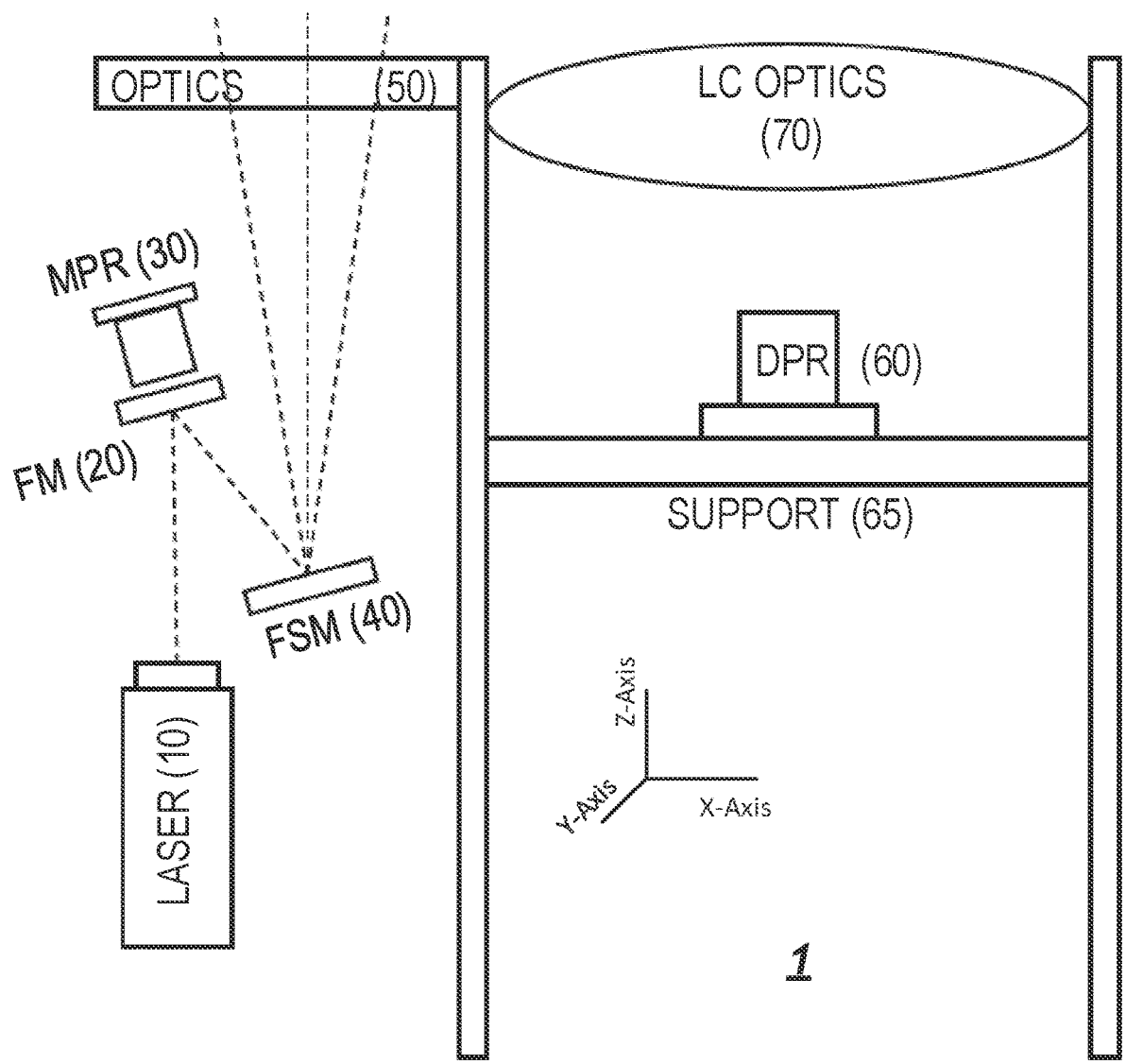
FIG. 1 shows a tracking laser rangefinder (T-LRF) device, constructed according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Currently, LiDAR technologies tend to be the rangefinder technology of choice for many high-tech applications, including, for example, navigation of unmanned aerial systems (UAS), generation of high-resolution maps, or many applications in surveying, geodesy, geomatics, geography, geomorphology, seismology, forestry, atmospheric physics, laser guidance, and airborne laser swath mapping (ALSM), among others. LiDAR works by targeting an object with a laser and measuring the time for a reflected light beam to return to a receiver. In this regard, LiDAR typically generates a point cloud of data, taking range data from every reflection pulse it encounters. Using time of flight, LiDAR times the travel for each pulse to determine the time for the reflected light beam to return for each pulse.

A LiDAR laser can be scanned in a raster or Lissajous pattern using a scanning mirror such as a MEMS (microelectromechanical system) device. A point cloud of range can be built up using the angle of the scanning mirror at the time of each pulse, combined with the range sensed. Although suitable for most applications, the inventors have discovered that LiDAR technologies can be unsuitable for certain applications where fast-moving objects are involved. Because LiDAR systems tend to require continuous scanning, they can be susceptible to latency problems. For instance, it can take a LiDAR system several seconds to scan an entire field of view (FoV), since it can take a significant amount of time to scan all points in the entire FoV or to process the large amounts of data that tends to be generated by the scanning operation. This can be problematic where fast-moving targets are involved, since the targets can move at a speed or direction, or change speed or direction at a rate that the LiDAR system cannot track. This can be especially problematic for applications where a long-range camera needs to be aimed at the target for identification, such as, for example, counter-UAS systems, or where the information is used for targeting.

In order to maintain requisite resolution for many applications, it is necessary to use one pulse for each range finding operation that uses time of flight (ToF) to determine distance to target. A counter timer is typically used to measure ToF, measuring the time it takes for an outgoing pulse to return to source. Since the speed of light in air (or any other medium) can be known or determined, the range (or distance to target) can be determined based on the time it takes for a light beam pulse to complete its travel, from origination to return. This means that digital signal processing (DSP) techniques such as correlation or lock-in amplifiers may not be possible to use under such constraints. And, since LiDAR systems operate in noisy environments, including noise generated by internal components, it is necessary generate high-power lasers, thereby increasing laser power requirements, in order to ensure returned pulses are detectable above the noise floor of the LiDAR system or its surroundings. As a result, the range of LiDAR systems is frequently limited where the laser has to be eye-safe, such as, for example, when performing rangefinding operations in locations where people might be present.

A tracking laser rangefinder (T-LRF) technology is provided that overcomes such problems or drawbacks of existing rangefinder technologies such as, for example, LiDAR systems. The T-LRF technology includes a T-LRF device, a computer-implemented T-LRF method, and a T-LRF system capable of accurately detecting, targeting, tracking or rangefinding an object. To improve range performance, the T-LRF device or T-LRF system can be arranged to concentrate light from a wide area onto a small spot, which can be directed to and focused on a detector photoreceptor (DPR). The DPR can include a time-of-flight (ToF) sensor. The DPR can include a time-of-flight timer integrated circuit (IC) and the ToF sensor. The T-LRF technology can be arranged balance concentration ratio requirements with acceptance angle requirements. As discussed in detail below, the T-LRF device can be arranged to overcome the Etendue principle, thereby realizing longer range performance than existing technologies, including technologies such as LiDAR.

The T-LRF technology described herein can achieve concentration ratios and acceptance angles that are not possible with existing technologies. The T-LRF device can include multiple concentrator optics and detectors, and combine signals electronically such that the output of each photodetector channel is summed with all the others.

The T-LRF device can be arranged to work with weaker, noisier signals than existing technologies, including signals that are close to or below the noise floor. In this regard, the T-LRF device can include digital signal processing (DSP) to increase signal-to-noise ratios (SNR). Since the signal is typically analog, and the lasers have very short pulse durations, very high-speed analog-to-digital converters (ADC) can be included to convert the signals to digital form, which can then be input to the DSP.

The DSP can be arranged to filter out any unwanted noise and generate a time stamp for each received reflected light beam pulse or pulse burst.

The T-LRF device can include a controller. The T-LRF controller can include a processor having digital logic that can be implemented on a Field Programmable Gate Array (FPGA) to perform a large number of custom digital functions at very high speeds. The processor can include an FPGA.

The T-LRF device can include a time of flight (ToF) integrated circuit (IC) (or ToF IC). ToF ICs are typically provided as IC chips that are relatively inexpensive and can provide superior timing accuracy for strong signals. ToF ICs consume little power, are small and lightweight, making them suitable for inclusion in the T-LRF devices that might be used onboard aerial vehicles.

The T-LRF device can be arranged to scan any or all points in a scan plane (for example, X-Y plane) in the field of view of the T-LRF. In this non-limiting example, X, Y, Z correspond to the X-axis, Y-axis and Z-axis coordinates in the Cartesian coordinate system. The scan plane can be arranged to be perpendicular to a central axis of the field of view (CFoV), such that an outgoing pulsating laser beam, laser pulse or laser burst traveling along the CFoV would impinge the center of the portion of scan plane that is within the field of view. A laser pulse can include a single laser pulse or burst of laser pulses. The CFoV is the shortest distance in the field of view between the scan plane and the laser source. The location of any point in the field of view can be determined based on its location with respect to the CFoV and distance to the laser source. For instance, the location of any point in the field of view can be determined with respect to the T-LRF device by measuring the distance between the point and the laser transceiver based on the travel time of the laser pulse (outgoing and return times) taken together with the angle X and angle Y, with respect to the CFoV, to the location of that point in the field of view. The T-LRF device can be arranged to calculate the angle X, angle Y and distance D to each object that appears in the field of view. The angle-distance data (for example, X, Y, D) can be output by the T-LRF device to a host system (not shown). The host system (not shown) can include, for example, an UAS controller, an unmanned aerial vehicle (UAV) control system, or any computing device, communicating device or computing resource that can be arranged to receive or use the angle-distance data to perform or control an operation.

The T-LRF device can be arranged to project and steer laser pulses at a high rate of repetition, such as for example, about 100 kHz, or more. A timer, such as, for example, a time-of-flight integrated circuit (ToF IC) can be triggered each time a laser pulse is emitted so as to count the amount of time it takes between emission of the laser pulse and its return to the T-LRF device. The timer can be triggered and start timing simultaneously with the triggering of transmitted of the laser pulse. The timer can be stopped when a reflected laser pulse of sufficient strength is detected. The distance for each pulse can then be calculated from this time of flight and recorded together with the X angle and Y angle of the fast-scan mirror at the instant the reflected laser pulse is received.

FIG. 1 depicts a non-limiting embodiment of a T-LRF device 1, constructed according to the principles of the disclosure. The T-LRF device 1 can include a laser source 10, a fixed mirror (FM) 20, a monitor photoreceptor (MPR) 30, a fast-scan mirror (FSM) 40 and optics 50. The T-LRF device 1 can include housing containing a detector photoreceptor (DPR) 60 and light collecting (LC) optics 70. The DPR 60 can be mounted to or integrally formed with a support 65. The DPR 60 can include a time-of-flight (ToF) sensor. The DPR 60 can include a time-of-flight integrated circuit (ToF IC) and the ToF sensor. In an embodiment, the DPR 60 can be connected to a ToF IC. The ToF IC can include a timer arranged to count the time-of-flight of returning laser pulses, from time of initial emission by the laser source 10 to the instant the returning laser pulse impinges the DPR 60. The DPR 60 can be arranged to output a return pulse detection signal upon being impinged and sensing a return laser pulse.

The laser source 10 can include a laser pulse or burst generator, such as, for example, a solid-state laser, a gas laser, an excimer laser, a dye laser, a semiconductor laser (for example, a laser diode), or any device that can emit a beam, pulse or burst of coherent and highly collimated light. The laser source 10 can include a collimator lens (not shown), a zoom lens (not shown), a laser line generator lens (not shown), a Powell lens (not shown), a non-telecenter lens (not shown), or a focus lens (not shown). The laser source 10 can be arranged, or can be controlled, to adjust properties of the laser, including, for example, direction, wavelength, gain bandwidth, monochromaticity, spatial or temporal profiles, collimation, output power, coherence, or polarization.

In a non-limiting embodiment, the laser source 10 comprises a pulsed laser diode (PLD) or a short-pulsed laser diode. The laser source 10 can be arranged to generate a coherent, highly-collimated light at, for example, 90 watts (W) and having a wavelength of 905 nanometers (nm). The laser source 10 can be arranged to generate wavelengths short than 905 nm, or longer than 905 nm, or power greater than, or less than 90 W. For instance, the laser source 10 can be arranged to generate wavelengths in the range, for example, between 635 nm and 980 nm.

In another non-limiting embodiment, the laser source 10 can be arranged to generate a pulsed laser at 50 kW and 1534 nm, a pulsed laser at 5 kW and 1550 nm, or a pulsed laser at 100 W and 1550 nm, or any combination thereof, in which case the pulsed laser can be generated simultaneously or alternatingly. In other embodiments, the laser source 10 can include power-ratings that are greater (or less) than any of the foregoing power-ratings, or wavelengths that are greater (or less) than any of the foregoing wavelengths.

The wavelength-power combinations selected for the laser source 10 can vary, depending on application. For instance, the 905 nm-90 W wavelength-power selection can be used to achieve lower eye-safety power levels. In an embodiment, the laser can have a wavelength of 1550 nm, which can be, under circumstances, better for eye safety as it permits higher power levels without causing damage. However, higher power wavelength-power combinations can be used where eye-safety is less of concern.

The fixed mirror (FM) 20 can include, for example, a flat mirror, a curved mirror, or any mirror device suitable for the purpose of deflecting a laser without any loss in optical power of the laser. The fixed mirror 20 can include a stable mirror, an ultra-stable mirror, or a hard-mounted mirror. The fixed mirror 20 can be positioned to receive and deflect the light beam from laser source 10 to the fast-scan mirror 40 with a negligible amount or no loss of optical power.

The monitor photoreceptor (MPR) 30 can be located proximate, or attached, to the fixed mirror 20 and arranged to measure and monitor one or more properties of the laser, including, for example, frequency, wavelength, power, direction, pulse shape or timing. The MPR 30 can be integrated with the laser source 10. The MPR 30 can be arranged detect a portion of the laser emitted by the laser source 10, including a wavelength, frequency, phase, time, or power level of the laser. In this regard, the FSM 20 can be arranged to deflect, for example, 98% or more of the laser, allowing 2% or less to be sensed by the MPR 30. An output of the MPR 30 can be fed to the processor 105 (for example, shown in FIG. 2), which can then be sampled and used to determine a reference value for noise reduction by the lock-in amplifiers, for example, in the DSP in the processor 105.

The monitor photoreceptor (MPR) 30 can include a photoreceptor or photosensor, or an array of photoreceptors or photosensors. The array can include a one-dimensional array or a multidimensional array (for example, 2-dimensional or 3-dimensional array) of photoreceptors or photosensors. The photoreceptor or photosensor can include a semiconductor-based device such as, for example, a photodiode, a phototransistor, a solaristor or a charge-coupled device (CCD).

The fast-scan mirror (FSM) 40 can include, for example, a single MEMS mirror, a dual-axis MEMS mirror, a single axis micro-opto-electro-mechanical system (MOEMS) mirror, a dual-axis MOEMS, a single axis coil mirror (CM), a dual-axis CM, a single axis voice-coil mirror (VCM), a dual-axis VCM, a piezoelectric actuator mirror (PAC), or any gimbal-less single or dual-axis mirror device that can meet size, weight, power consumption and performance requirements for inclusion in the T-LRF device 1, as will be understood by those skilled in the art. The fast-scan mirror 40 can be arranged to scan the laser in the scan plane (for example, X-Y plane) along a scan-axis (for example, X-axis or Y-axis), as depicted in FIG. 1. The fast-scan mirror 40 can be arranged to scan an entire field of view of the T-LRF device 1. The fast-scan mirror 40 can be arranged to be driven (for example, by an X-Y driver circuit) to steer the laser to impinge any point in the multidimensional field-of-view (X, Y, Z).

The FSM 40 can include a built-in position feedback for accurate and fast-response control. The MEMS device can include, for example, electromagnetic, electrostatic or piezo-based MEMS devices. The FSM 40 can include any suitable fast-steering mirror device. The FSM 40 can include, for example, a tip/tilt mirror platform, a fast tip/tilt steering mirror, a tip/tilt piston mirror, a tip/tilt/piston platform, a piezo-Z stage, or a piezo-Z tip-tilt stage.

The optics 50 or light collecting (LC) optics 70 can include, for example, one or more lenses, one or more beam splitters, one or more mirrors, one or more shutters, one or more filters, one or more polarizers, or other optics components. The optics 50 or LC optics 70 can include, for example, a collimator lens (not shown), a zoom lens (not shown), a laser line generator lens (not shown), a Powell lense (not shown), a non-telecentric lens (not shown), or a focus lens (not shown).

The detector photoreceptor (DPR) 60 can include a photoreceptor or photosensor arranged to detect a light having properties corresponding to the laser generated by the laser source 10, such as, for example, wavelength or frequency. The DPR 60 can include a single photoreceptor or photosensor, or an array of photoreceptors or photosensors. The array can include a one-dimensional or a multidimensional array of photoreceptors or photosensors. The detector photoreceptor 60 can include, for example, an Avalanche photodiode (APD), a silicon photomultiplier (SiPM), a photomultiplier tube, an InGaAS (Indium/Gallium/Arsenide) Avalanche photodiode (APD), or a quadrant APD (QAPD).

Figure 3:
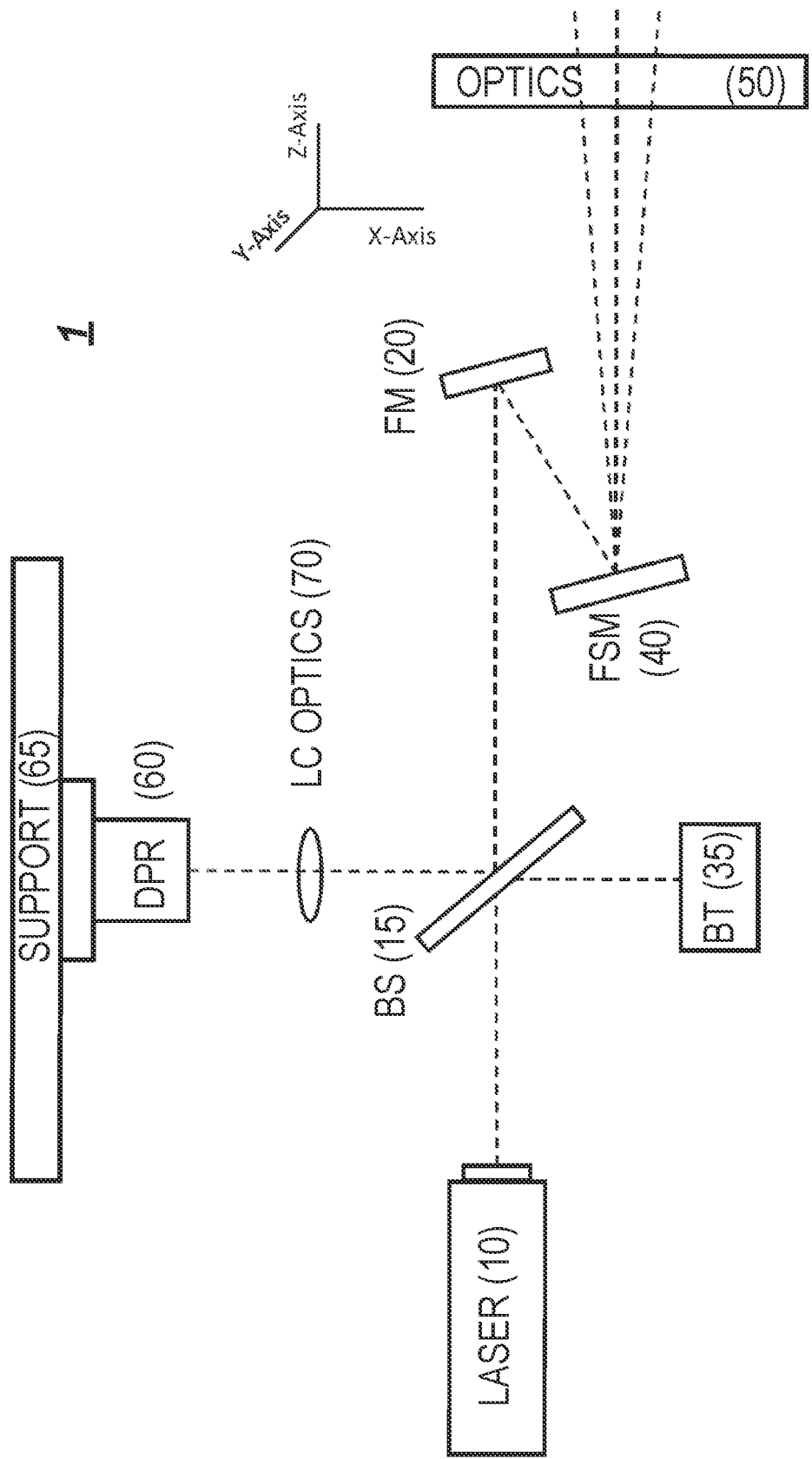
FIG. 3 shows another T-LRF device, constructed according to the principles of the disclosure.

The detector photoreceptor 60 can be arranged separate from the laser generation or beam steering elements in the T-LRF device 1, as seen, for example, in FIG. 1, or combined with certain of the laser generation or beam steering elements, as seen, for example, in FIG. 3. In the embodiment depicted in FIG. 1, the detector photoreceptor 60 is separate from the laser generation or beam steering elements so as to minimize the size of the fast-scan mirror 40, thus allowing for high-speed operation. This can allow for a larger aperture for reflected light collection for the detector photoreceptor 60.

The T-LRF device 1 can be arranged to operate the fast-scan mirror (FSM) 40 with a laser rangefinder to find and track in real-time the position of fast-moving objects. The laser source 10 can be arranged to generate high repetition rate, high power laser pulses, which can be deflected and directed by the FSM 40 to steer the laser to the target. The outgoing laser pulses can be sampled and used as a reference level for a lock-in amplifier, which can then generate amplitude and phase information by, for example, combing the reference level and incoming pulses. This can also filter unwanted optical and electronic noise, thereby improving the sensitivity of the T-LRF device 1.

Figure 2:
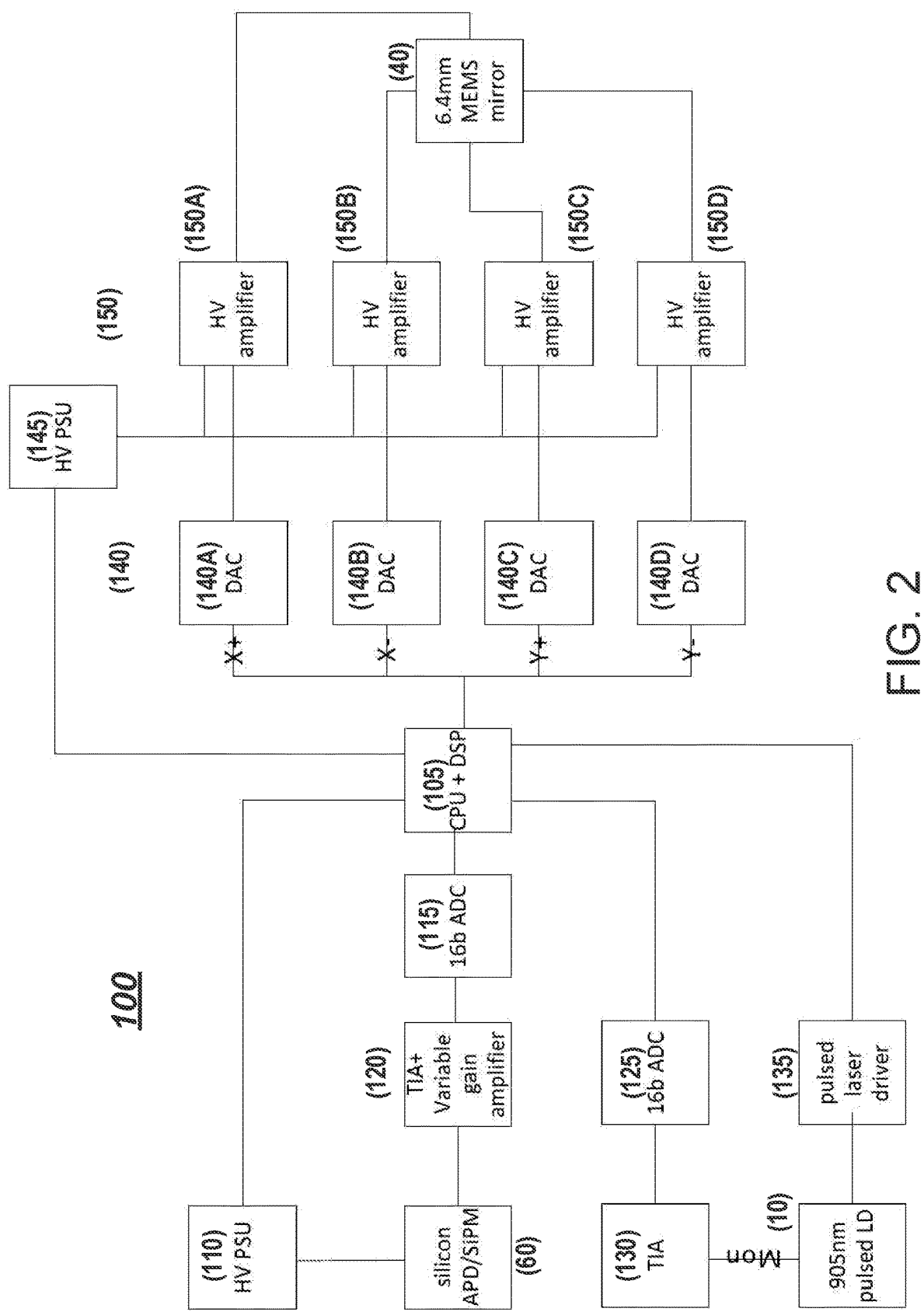
FIG. 2 shows a controller for a T-LRF device, constructed according to the principles of the disclosure.

FIG. 2 shows a non-limiting embodiment of a controller 100 for a T-LRF device, constructed according to the principles of the disclosure. The T-LRF controller 100 can be included in the T-LRF device, or connected to the T-LRF device. In this non-limiting embodiment, the controller 100 comprises at least one processor 105, a high-voltage (HV) power supply unit (PSU) 110, an analog-to-digital convert (ADC) 115, a transimpedance amplifier (TIA) 120, an ADC 125, a TIA 130, a laser driver 135, a digital-to-analog (DAC) group 140, an HV PSU 145, and a high-voltage (HV) amplifier group 150, as seen in FIG. 2. The controller 100 can comprise, or it can be connected to, any of the laser source 10, fast-scan mirror 40 and detector photoreceptor 60, which in this embodiment comprise a 905 nm pulsed laser diode (10), a 6.4 mm dual-axis MEMS mirror (40), and an Avalanche photodiode (60), respectively.

The processor 105 can include any one or more of various commercially available computing devices. The processor 105 can include, for example, a central processing unit (CPU), an ARM (Advanced RISC Machines) CPU, a graphic processing unit (GPU), a general-purpose GPU (GPGPU), a field programmable gate array (FGPA), an application-specific integrated circuit (ASIC), a system-on-a-chip (SOC), a single-board computer (SBC), a complex programmable logic device (CPLD), a digital signal processor (DSP), a manycore processor, multiple microprocessors, or any computing device architecture capable of performing the operations described or contemplated herein. The processor 105 can include a storage (not shown). The processor 105 can be arranged to interact with any of the components 110 to 150, or 10, or 40, or 60, to carry out or facilitate the processes included, described or contemplated by this disclosure.

In the non-limiting embodiment depicted in FIG. 2, the processor 105 comprises a CPU and a DSP. The DSP in the processor 105 can include signal acquisition hardware to sense the frequency and harmonic content of the outgoing laser pulses as the digital reference signal, and the reflected laser pulse signal from the detector photoreceptor 60. Both the digital reference signal and the received reflected laser pulse signals can be fed into a DSP-based lock-in amplifier. The reference signal can be determined based on, for example, the output of the MPR 30 (shown in FIG. 1). The DSP can generate and output amplitude and phase information of the received pulses from the distant target.

The DSP-based lock-in amplifier can be included in the processor 105, or elsewhere in the controller 100.

The lock-in amplifier can be included to extend the range and performance of the T-LRF device 1, while simultaneously maintaining an eye-safe aspect of the laser. The lock-in amplifier can be arranged to allow the received reflected pulse signal to be 30 dB or more below a noise floor of the ambient optical and electronic noise present at the receiver, and still have the received reflected pulse signal discernable.

The lock-in amplifier can be arranged to generate amplitude information, which can then be used for target presence detection and phase determination, the latter being useable for range finding and calculation. The lock-in amplifier (for example, in the processor 105) can be arranged to sample an output from the MPR 30 to determine the frequency, wavelength, phase, timing, or power level of the laser emitted from the laser source 10 (shown in FIG. 1).

In an alternative embodiment, the sampled (or digital) reference signal and returned reflected laser pulse signals can be processed by the processor 105 using DSP techniques to improve signal to noise ratio and reject false positive signals.

Regarding the digital reference signal, the outgoing laser pulses can be monitored and measured by the processor 105 via the MPR 30 or the TIA 130 and ADC 125. The TIA 130 can be coupled to the laser source 10 and configured to receive the frequency and harmonic content of the outgoing laser pulses and output an analog reference signal to the ADC 125. In this embodiment, the ADC 125 includes a sixteen (16) bit ADC that can convert the analog reference signal into a digital reference signal, which can then be output from the ADC 125 to an input of the processor 105.

Contemporaneously, reflected light beam pulses can be detected by the detector photoreceptor 60. The reflected light beam pulses can include reflections (or return pulses) of the outgoing laser pulses, as they are reflected from the target and collected by the LC optics 70 (shown in FIG. 1). When impinged by a reflected light beam pulse, the detector photoreceptor 60 can generate and output a pulse signal corresponding to the impinging reflected light beam pulse. The resultant pulse signal can be amplified by the TIA 120 and converted to digital form by the ADC 115, which in this embodiment is a sixteen (16) bit ADC. The digital pulse signal can be output from the ADC 115 to an input of the processor 105, as seen in FIG. 2.

Since the DPR 60 includes an Avalanche photodiode (APD) in this embodiment, the HV PSU 110 can be arranged to apply a high voltage bias to operate the APD, since the APD requires a voltage bias of, for example between 20 volts (V) and 90V, or greater. The HV PSU 110 can be controlled by the processor 105.

The processor 105 is also arranged to control and drive the laser source 10, which in this embodiment includes the 905 nm pulsed laser diode. The laser source 10 can be controlled or driven by means of the pulsed laser driver 135, which can be connected to the processor 105.

On the basis of the received digital reference signal and the received reflected laser pulse signals, the processor 105 can generate amplitude and phase information of the received pulses from the distant target. The amplitude information can be used to determine, for example, if the laser is reflecting off a target or going into free space. In the meantime, the phase can be used to determine, for example, the range to the target. This information can then be used by the processor 150 to nutate the laser source 10 and, thereby, the laser pulses, in order to maintain a close lock between the angle of the scanning mirror 40 and the angle of the target. The mirror angle information and range information can be continuously fed back to a host system (not shown) at a much higher refresh rate.

The host system (not shown) can include, for example, an onboard computer of an aircraft, a launcher, a camera, a display, or any device or system that might be able to use or benefit from use of the T-LRF controller 100.

The T-LRF controller 100 can be arranged to operate in any number of modes, include any of three modes: a search mode for finding a target by sweeping the laser in a search pattern; a tracking mode where the laser is held on the target to generate continuous range and X/Y angle information (for example, angle X, angle Y, distance D data); and, a laser rangefinder (LRF) mode where the laser is steered to the center, or boresighted to the body, of the target, or steered to any point within its field of view. In an embodiment where the controller 100 is connect to, or included in, a host system, the continuous range and X/Y angle information can be output to the host system.

In an embodiment, in LRF mode, the refresh rate may not be as important since the device might be ranging to a static or slow moving target. In this scenario the user can trade refresh rate for range. The T-LRF can achieve this by, for example, sending a large number of pulses for every reading (the Signal to Noise Ratio can improve with the more pulses the device sends when processing).

For the search mode, the processor 105 can be arranged to acquire a target in the field of view. Under controller of the processor 105, the laser can be steered by the fast-scan mirror 40 in a search pattern to locate potential targets. The processor 105 can receive a cue, such as, for example, from the host system, which can include approximate X/Y coordinates and range data from long range sensors such as Radar (not shown) in order to reduce the acquisition time and prevent falsely locking onto the wrong target. During this phase, amplitude and range information can be fed back, by the processor 105, to the host system to aid selection of the correct target.

Referring to FIG. 2, the angle, direction and rate at which the fast-scan mirror 50 operates can be controlled by the processor 105 via the DAC group 150 and HV amplifier group 150, which can be powered by the HV PSU 145. The DAC group 150 and HV amplifier group 150 can include four channels, as seen in FIG. 2, two channels for the X-axis control and two channels for Y-axis control. The real-time angle, direction of motion and rate of motion of the scanning-mirror 40 can be known continuously by the processor 105.

Once a target is acquired, the controller 100 can switch to the tracking mode. In the tracking mode, the controller 100 can operate the fast-scan mirror 40 to steer the laser to nutate around the target and remain pointed consistently at the target, based on the amplitude and range data received from the lock-in amplifier (for example, in the DSP in the processor 105). The very fast response time of the fast-scan mirror 40 can allow the controller 100 to remain locked on the target even under high radial velocity/acceleration conditions. The range data and the X/Y angle data determined from the position of the fast-scan mirror 40 can be continuously output to the host system.

In either, or both, the search mode and the tracking mode, the strength (for example, amplitude) of the reflected light beam pulses and the range can be used to adjust the laser power of the laser source 10 in order to improve eye safety. For example, the reflected light beam pulses can be very strong for targets that are close to the T-LRF device 1, in which case the laser power can be reduced to the minimum power necessary to maintain accurate lock. Conversely, if there are no targets in proximity, the laser power can be increased to maximize long range performance. Accordingly, by controlling the laser power thus, the average laser power and the individual pulse power that could potentially enter the eye of animals located at close ranges can be minimized.

The T-LRF device 1, including controller 100, can be designed to be flexible, so it can operate with non-cooperative targets such as, for example, drones, birds, missiles, or space debris. The T-LRF device 1 can be suitable for shorter range applications such as, for example, counter-UAS, or for longer range applications such as, for example, removing hazardous debris from space (for example, the earth's orbit).

The T-LRF system can include the T-LRF device 1 and one or more cooperative targets. For cooperative targets such as, for example, retroreflectors, the applications for the T-LRF device 1, including the controller 100, can be significantly increased to include, for example, accurately navigating or docking spacecraft or satellites.

FIG. 3 shows another non-limiting embodiment of the T-LRF device 1, constructed according to the principles of the disclosure. In addition to the components seen in FIG. 1, this embodiment of the T-LRF device 1 can include a beam splitter (BS) 15 and a beam trap (BT) feedback sensor 35. As seen, the components in this embodiment of the T-LRF device 1 can be arranged differently compared to the embodiment depicted in FIG. 1. Also, in this embodiment, the detector photoreceptor (DPR) 60 can include a quadrant Avalanche photodiode (QAPD), which can include a two-dimensional array of Avalanche photodiodes.

The beam splitter (BS) 15 can include a polarizing beam splitter that only transmits the polarization emitted by the laser source 10 and reflects all other polarization.

Compared to the embodiment depicted in FIG. 1, the embodiment of the T-LRF device 1 seen in FIG. 3 can eliminate any need for nutate beam steering, since the QAPD 60 can provide accurate target tracking and faster search without needing to nutate the laser. This feature can be facilitated by the two-dimensional area of the QAPD 60.

Additionally, the embodiment depicted in FIG. 3 can allow for wide beam waist for low divergence, while simultaneously allowing for an intense or high-energy beam on the target. However, it may be desirable to take into consideration in this embodiment of T-LRF device 1 that the return strength of reflected laser pulses can be limited by the diameter of the fast-scan mirror 40, and the beam splitter 15 or beam trap 35 can result in laser energy loss.

Figure 4:
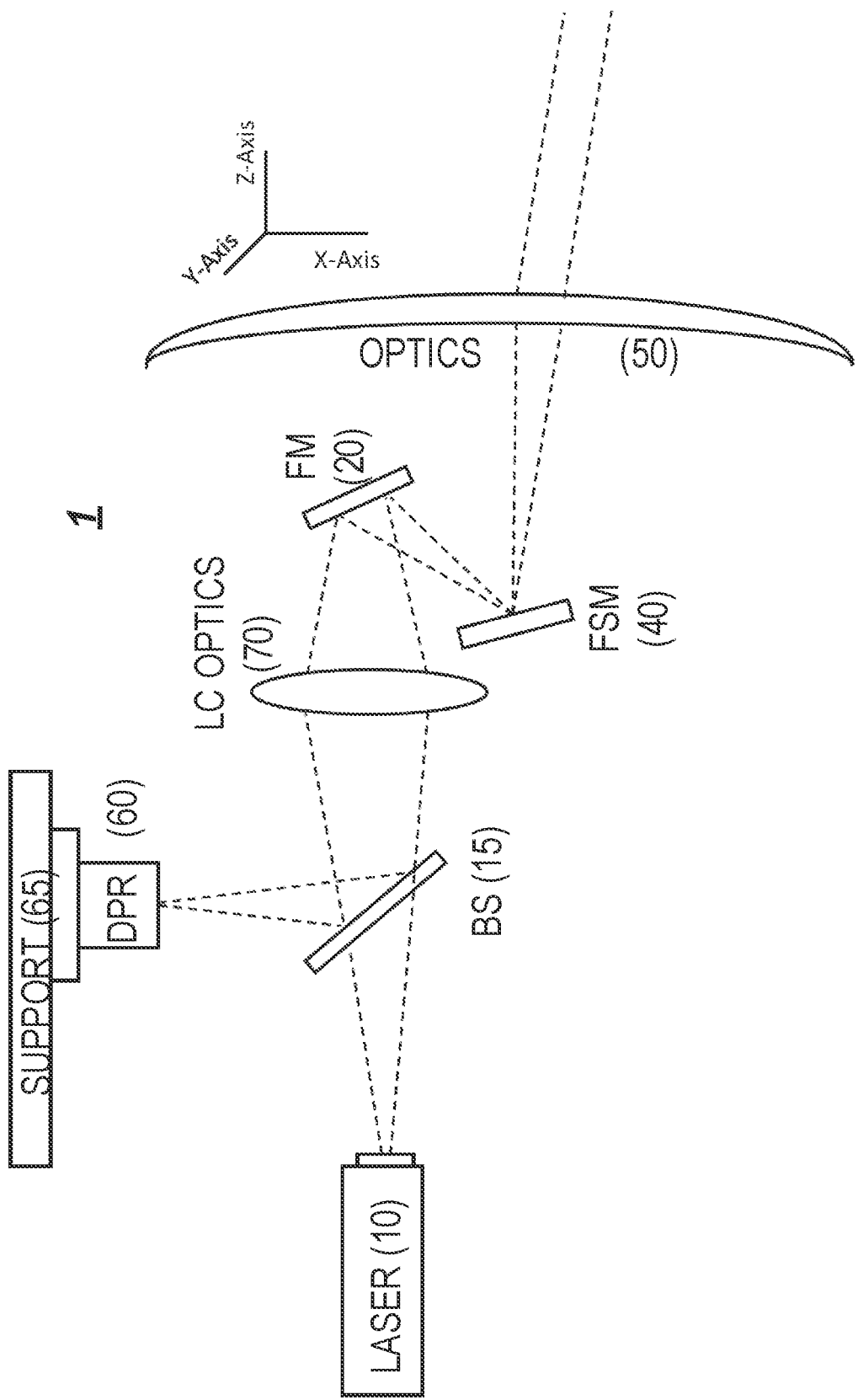
FIG. 4 shows a further T-LRF device, constructed according to the principles of the disclosure.

FIG. 4 shows another non-limiting embodiment of the T-LRF device 1, constructed according to the principles of the disclosure. In addition to the components seen in FIG. 1, this embodiment of the T-LRF device 1 can include the beam splitter (B S) 15. As seen, the components in this embodiment of the T-LRF device 1 can be arranged differently compared to the embodiments depicted in FIG. 1 or 3. Like the embodiment depicted in FIG. 3, in this embodiment the detector photoreceptor (DPR) 60 can include the QAPD.

Like the embodiment depicted in FIG. 3, this embodiment of the T-LRF device 1 can eliminate any need for nutate beam steering, since the QAPD 60 can provide accurate target tracking and faster search without needing to nutate the laser. It is noted that another type of quadrant sensor or focal plane array can be used for the detector photoreceptor 60.

In this embodiment, the beam splitter 15 can include a polarizing beam splitter; the fast-scan mirror 40 can include a 2 mm MEMS mirror; the optics 50 can include a non-telecentric scan lens; and, the laser source 10 can include a 1550 nm, 5 kW pulsed laser source. The optics 50, including non-telecentric scan lens, can be configured to have a significantly larger area than the optics 50 in the embodiments depicted in FIG. 1 or 3. The optics 50 can be arranged cover a larger field of view compared to some of the other embodiments.

The optics 50, including non-telecentric scan lens, can be arranged to post-focus the outgoing laser after scanning, thereby providing a large beam waist that can be used with a small fast-scan mirror 40. This arrangement can also provide a larger amount of reflected laser pulses being returned and focused back onto the fast-scan mirror 40 for coaxial sensing. Accordingly, the signals from the detector photoreceptor 60 can be processed by the processor 105 and used to control the fast-scan mirror 40 to steer the laser on to the target.

The optics 50 can be arranged as secondary beam folding optics used to improve the area over which light is collected and returned to the DPR 60. The same optics 50 can also help to focus and collimate the laser.

Compared to some other embodiments, the embodiment of the T-LRF device 1 depicted in FIG. 4 can gather larger amounts of return reflected laser pulses, and can include a smaller fast-scan mirror 40 that can faster target finding and tracking while providing greater resistance or tolerate to shock or vibration. The smaller fast-scan mirror 40 can allow for discrimination between multiple targets based on target size, target shape or reflection strength. The embodiment can provide a larger beam waist, resulting in a larger and faster area of coverage, while being eye safe. Additionally, this embodiment of the T-LRF device 1 can allow for coaxial sensing, for example, guiding beam steering based on multidimensional laser pulse detections made by the QAPD 60.

In this embodiment, the processor 105 can be arranged to adjust laser intensity to correct for lower intensity that might result on the target due to the large divergence of the outgoing laser pulse. The processor 105 can also be arranged to adjust the modulation frequency to keep up with fast-scan mirror 40, so as to minimize or avoid degradation in range accuracy.

Figure 5:
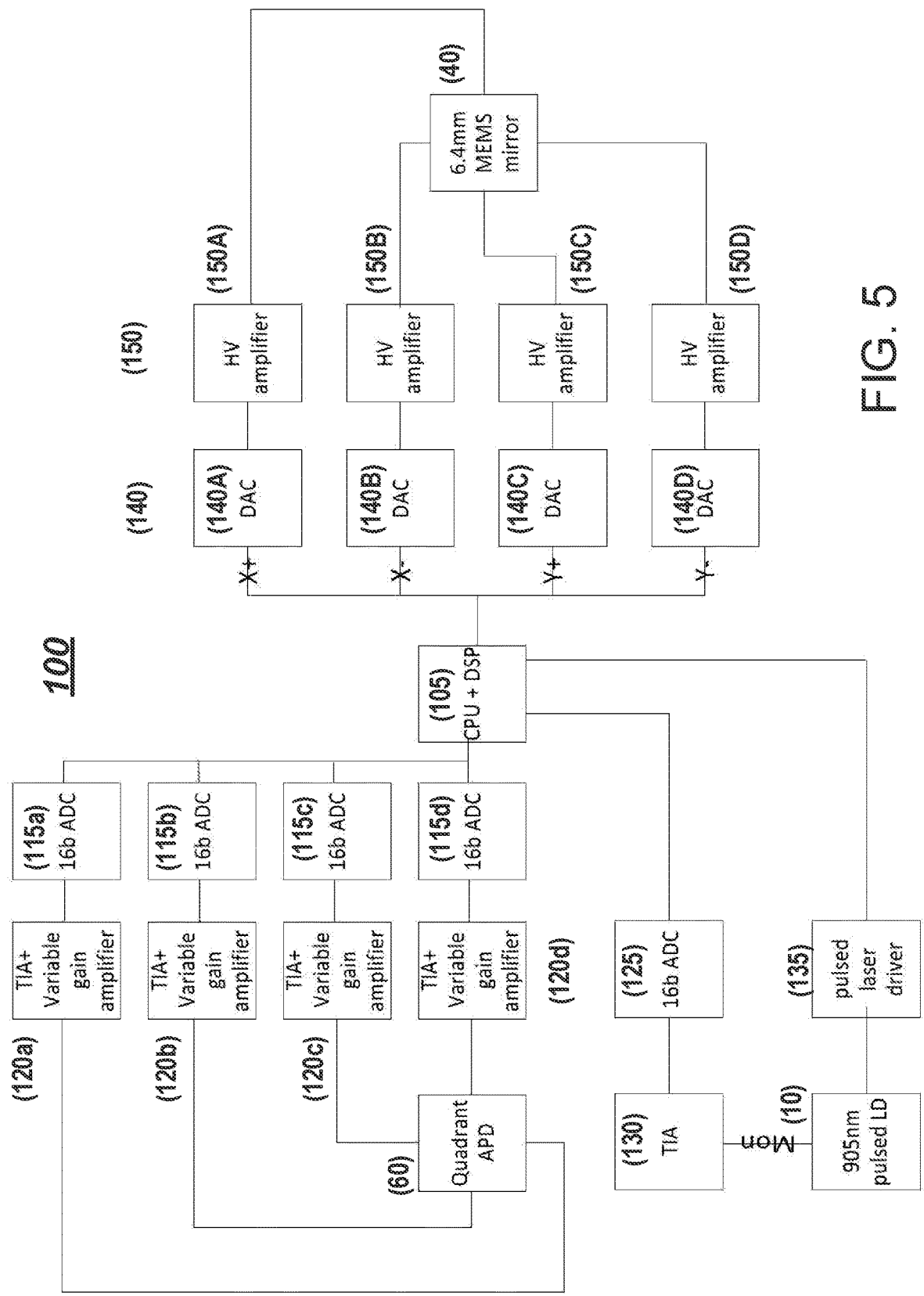
FIG. 5 another controller for a T-LRF device, constructed according to the principles of the disclosure.

FIG. 5 shows another non-limiting embodiment of the controller 100, which can be used with the non-limiting embodiments of the T-LRF device 1 depicted in FIG. 3 or 4. This embodiment of the T-LRF controller 100 can be included in either embodiment of the T-LRF device 1 (shown in FIG. 3 or 4), and, compared to the embodiment of the controller 100 depicted in FIG. 2, this embodiment can include the QAPD 60 connected to multiple channels (for example, four channels) of ADCs 115 (115a, 115b, 115c, 115d) and an equal number of channels of TIAs 120 (120a, 120b, 120c, 120d).

Referring to FIG. 5, the T-LRF controller 100 can offer better tracking performance than other embodiments that do not include, for example, the quadrant Avalanche Photodetector (APD) 60, which can offer directional feedback as to which quarter of the APD 60 the signal is the strongest from the distant object. However, the size of the fast-scan mirror 40 will need to be taken into consideration, since the size of the mirror can be determinative of the field of view and amount of reflected laser pulses that returned to the APD 60.

Figure 6:
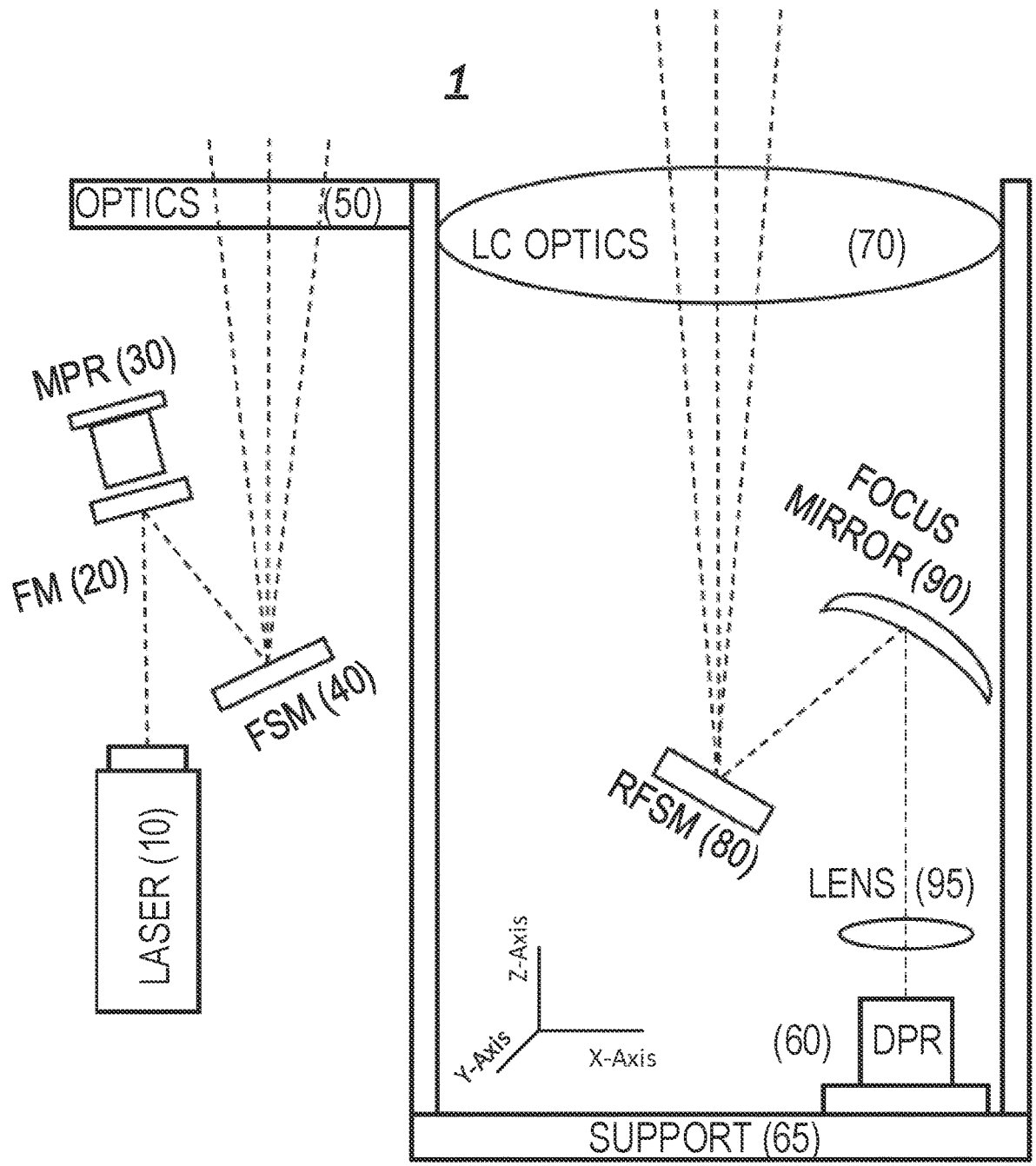
FIG. 6 shows a further T-LRF device, constructed according to the principles of the disclosure.

FIG. 6 shows another non-limiting embodiment of the T-LRF device 1, constructed according to the principles of the disclosure. In addition to some of the components seen in FIG. 1, this embodiment of the T-LRF device 1 can include a reflection fast-scan mirror (RFSM) 80, a focus mirror 90 and a lens 95. In this embodiment, the laser source 10 can include a 1550 nm pulsed laser module and the detector photoreceptor 60 can include an InGaAS (Indium/Gallium/Arsenide) Avalanche photodiode (APD) receiver. The reflection fast-scan mirror 80 can include a single-axis or multi-axis MEMS mirror.

The FMS 40 and RFMS 80 can be identical, or different from each other. The FMS 40 and RFMS 80 can be synchronized. The FMS 40 can be arranged to scan and steer the outgoing laser. The RFMS 80 can be arranged to scan and steer the received reflected laser pulse beam. The position, direction or rate of motion of the FMS 40 and RFMS 80 can be synchronized with respect to each other, such that the RFMS 80 can be pointed in real-time to the same or substantially the same location on a target that is being impinged at the same time by the outgoing laser. This configuration of the FMS 40 and RFMS 80 can allow for simpler optics compared to some of the other embodiments of the T-LRF device 1. This embodiment of the T-LRF device 1 can be arranged to provide the necessary light concentration on to the detector photoreceptor 60 whilst increasing the acceptance angle for the returned laser from the target.

In the embodiment depicted in FIG. 6, the T-LRF device 1 can avoid issues with Etendue since the RFSM 80 can help to help steer the reflected laser return back to the DPR 60. Thus, a larger area of collection can be provided with simpler optics. The controller 100 can include a phase-lock-loop (PLL) to synchronize the FSM 40 and RFSM 80, so as to correct for, for example, any manufacturing variations that might exist.

Figure 7:
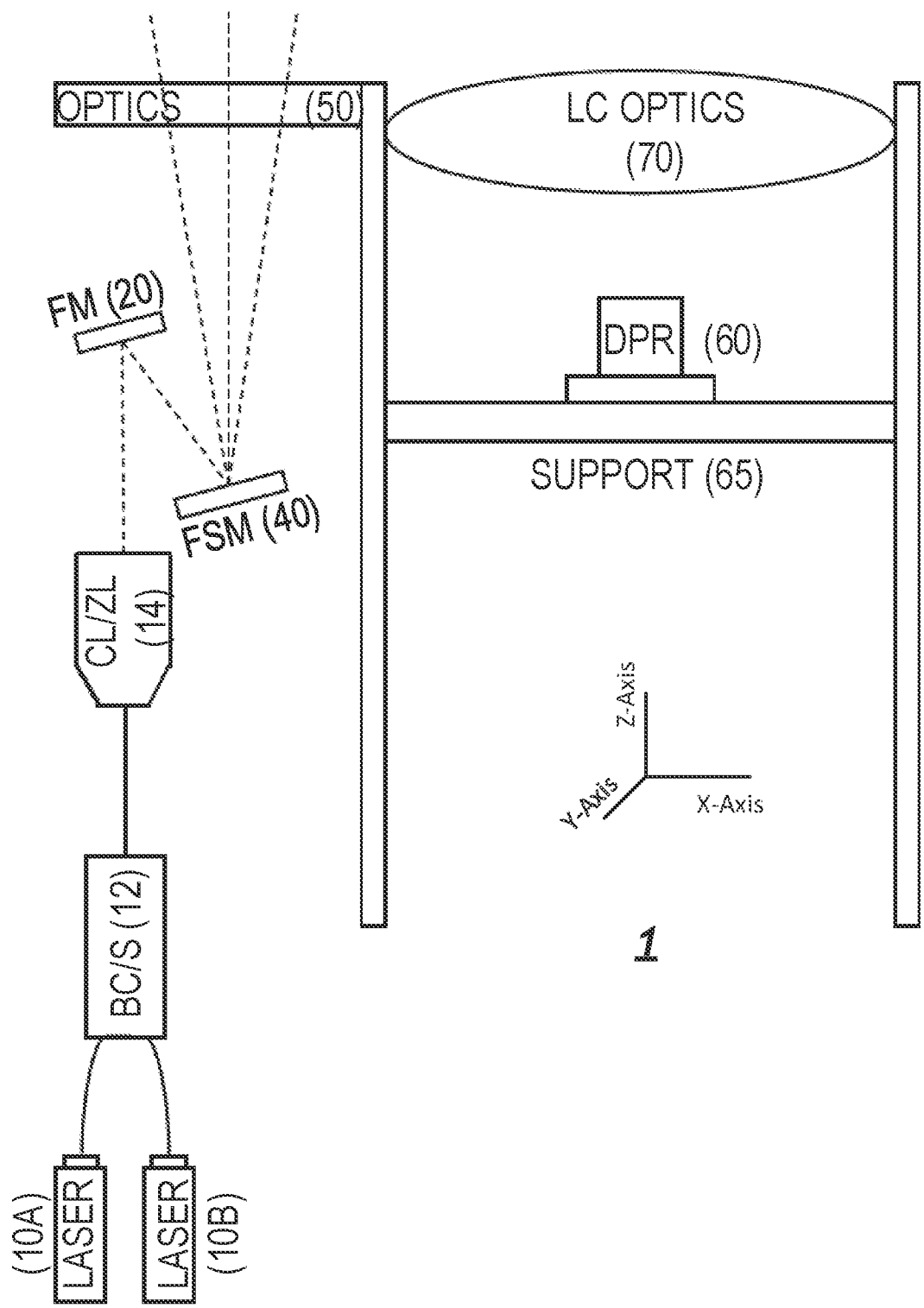
FIG. 7 shows a further T-LRF device, constructed according to the principles of the disclosure.

FIG. 7 shows another non-limiting embodiment of the T-LRF device 1, constructed according to the principles of the disclosure. In addition to some of the components seen in FIG. 1, this embodiment of the T-LRF device 1 can include a pair of laser sources 10A and 10B, a beam combiner/switch (BC/S) 12 and a collimator/zoom lens (CL/ZL) 14. This embodiment can include laser rangefinder technology for increases range capability and range accuracy compared to some of the other embodiments of the T-LRF device 1.

In this embodiment, the large receiving LC optics 70 can have a large area to allow for a larger capture area to receive reflected light beam pulses. The detector photoreceptor (DPR) 60 can include an InGaAs APD for coaxial detection and sensing. The fast-scan mirror (FSM) 40 can include a 2 mm MEMS mirror (single-axis or dual-axis).

The BC/S 12 can include a beam combiner lens, a beam switch, or any component or device capable of combining, or switching between, the lasers output from the laser sources 10A or 10B.

The CL/ZL 14 can include a collimator lens, a zoom lens, a focus lens, or any optical component or device that can collimate, zoom or focus the laser from the BC/S 12.

In this embodiment, the laser source 10A includes a 1534 nm, 50 kW pulsed laser source and the laser source 10B includes a 1550 nm, 100 W pulsed laser source. The laser 10B (or 10A) can be arranged to provide higher laser power while being eye safe. It is noted, that the laser sources 10A or 10B can each include any of the embodiments of the laser source 10 discussed herein.

In this embodiment, the reflection fast-scan mirror (RFSM) 80, a focus mirror 90 and a lens 95. In this embodiment, the laser source 10 can include a 1550 nm pulsed laser module and the detector photoreceptor 60 can included InGaAS Avalanche photodiode (APD) receiver. The reflection fast-scan mirror 80 can include a single-axis or multi-axis MEMS mirror.

Figure 8:
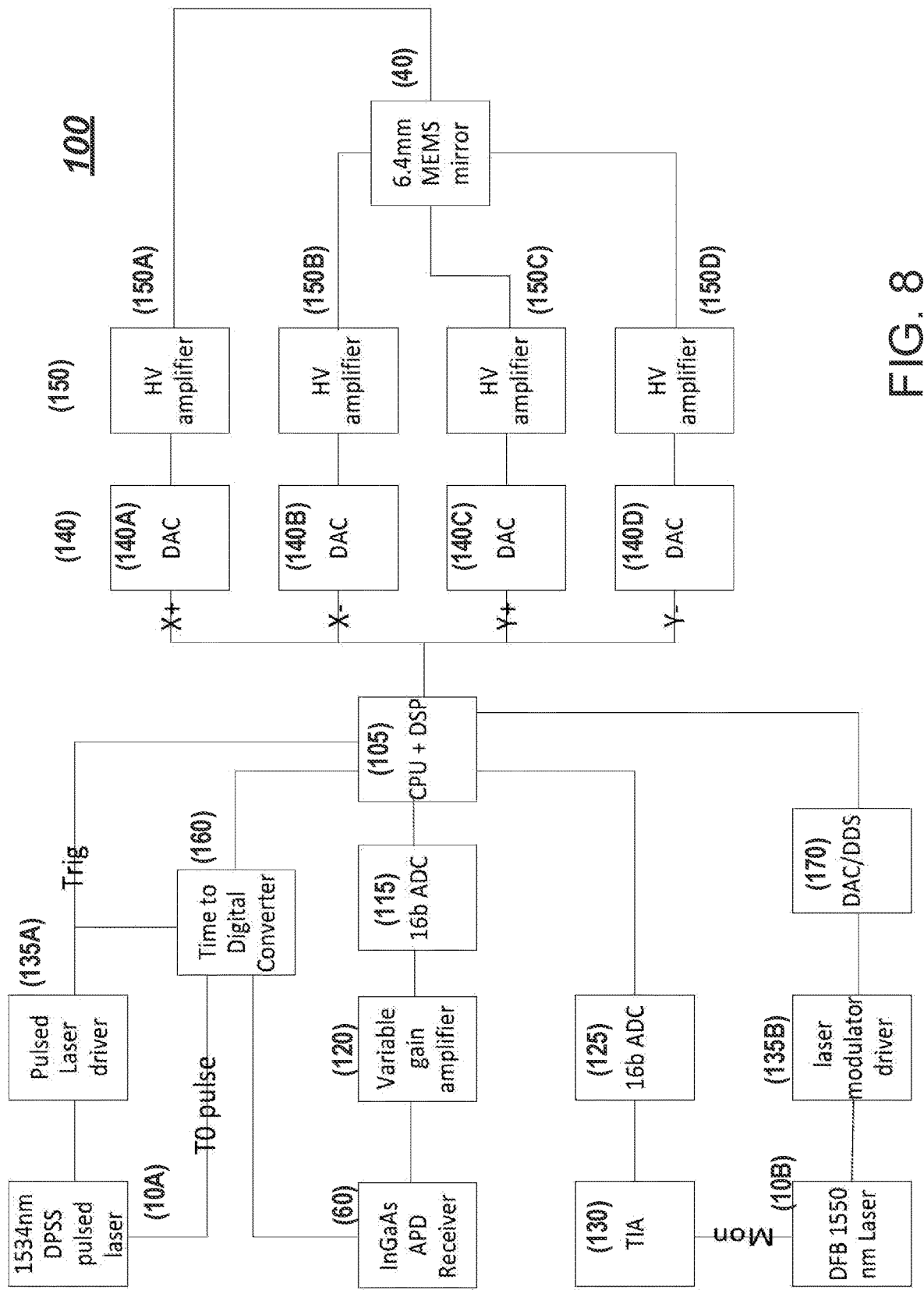
FIG. 8 shows a further controller for a T-LRF device, constructed according to the principles of the disclosure.

FIG. 8 shows another non-limiting embodiment of the controller 100, which can be used with the non-limiting embodiments of the T-LRF device 1 depicted in FIG. 7. This embodiment of the T-LRF controller 100 can be included in the embodiment of the T-LRF device 1 depicted in FIG. 7, and, compared to the embodiments of the controller 100 depicted in FIGS. 2 and 5, this embodiment can include a pair of laser drivers 135A, 135B, each arranged to drive lasers 10A, 10B, respectively, a time-to-digital converter (TDC) 160, and a digital-to-analog converter (DAC) 170.

The laser driver 135A can include a pulsed laser driver. The laser driver 135 can include a laser modulator driver.

The DAC 170 can include a direct digital synthesizer (DDS), which can be arranged to synthesize sinusoidal waveforms up to 5.9 GHz, or greater.

The TDC 160 can be arranged to measure elapsed time between a start pulse and up to n stop pulses, where n is a positive non-zero integer. The TDC 160 can be arranged to allow the processor 105 the flexibility to select which stop pulse yields the best performance. The TDC 160 can include an internal self-calibrated time base that can compensate for driver over time or temperature.

Figure 9:
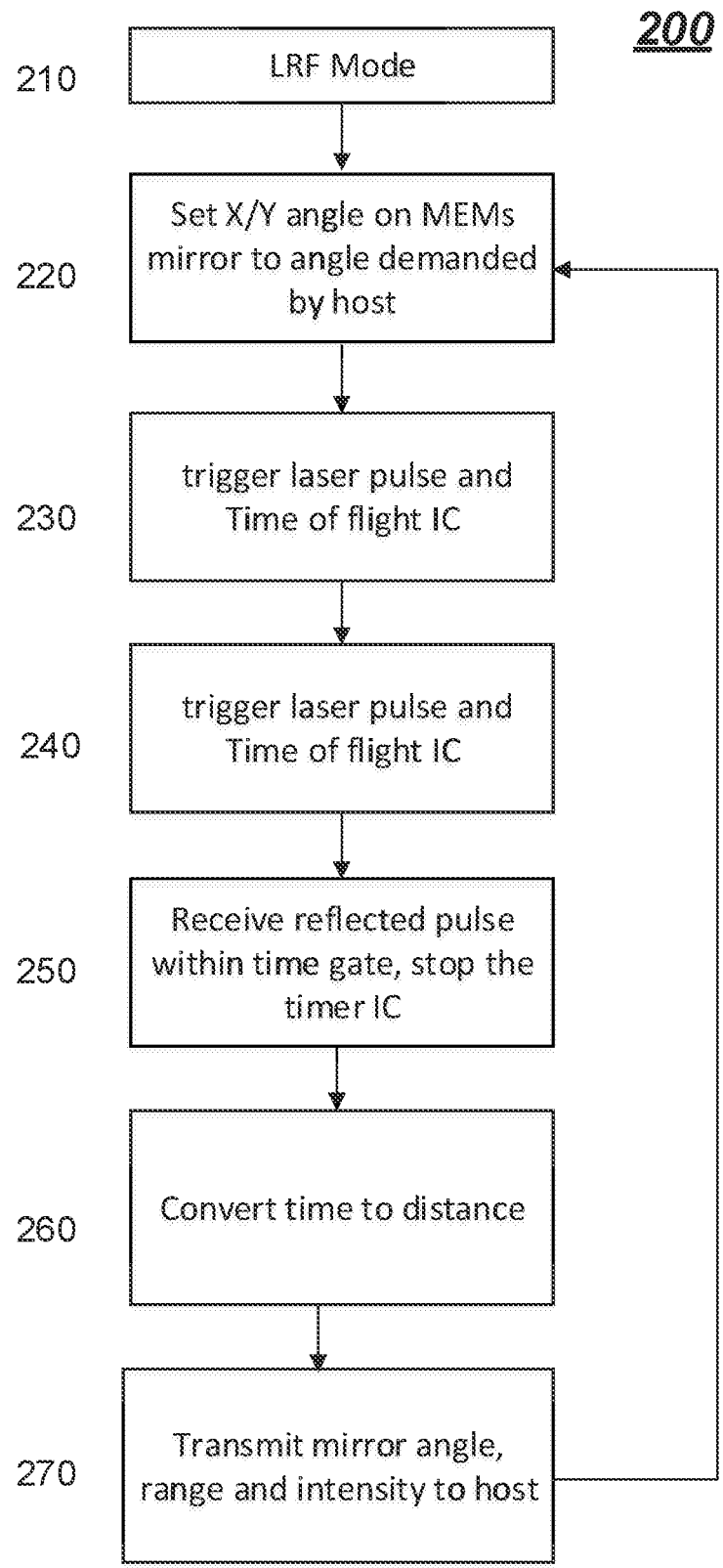
FIG. 9 shows a LRF mode process that can be performed by a T-LRF device, constructed according to the principles of the disclosure.
Figure 10:
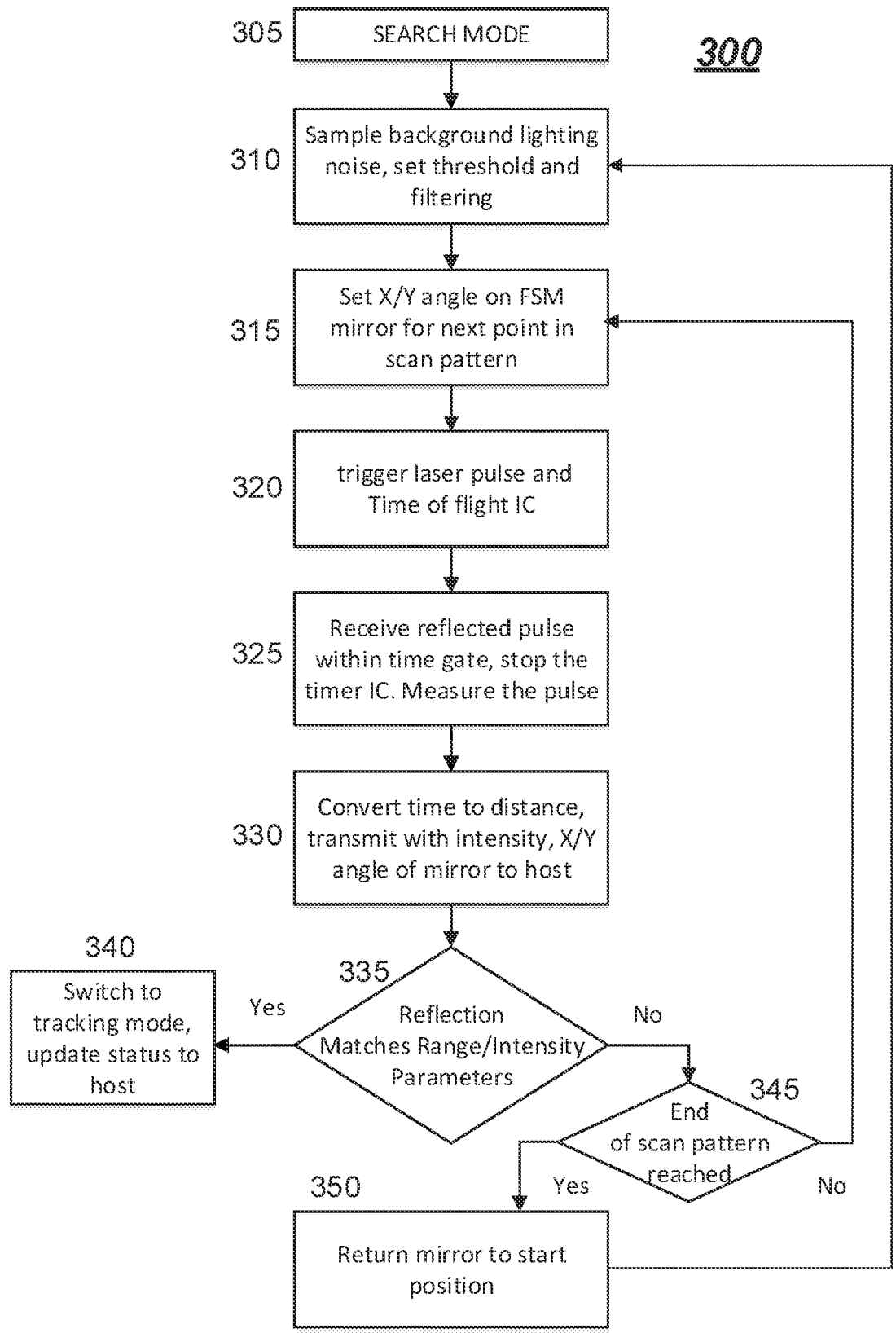
FIG. 10 shows a search mode process that can be performed by a T-LRF device, constructed according to the principles of the disclosure.
Figure 11:
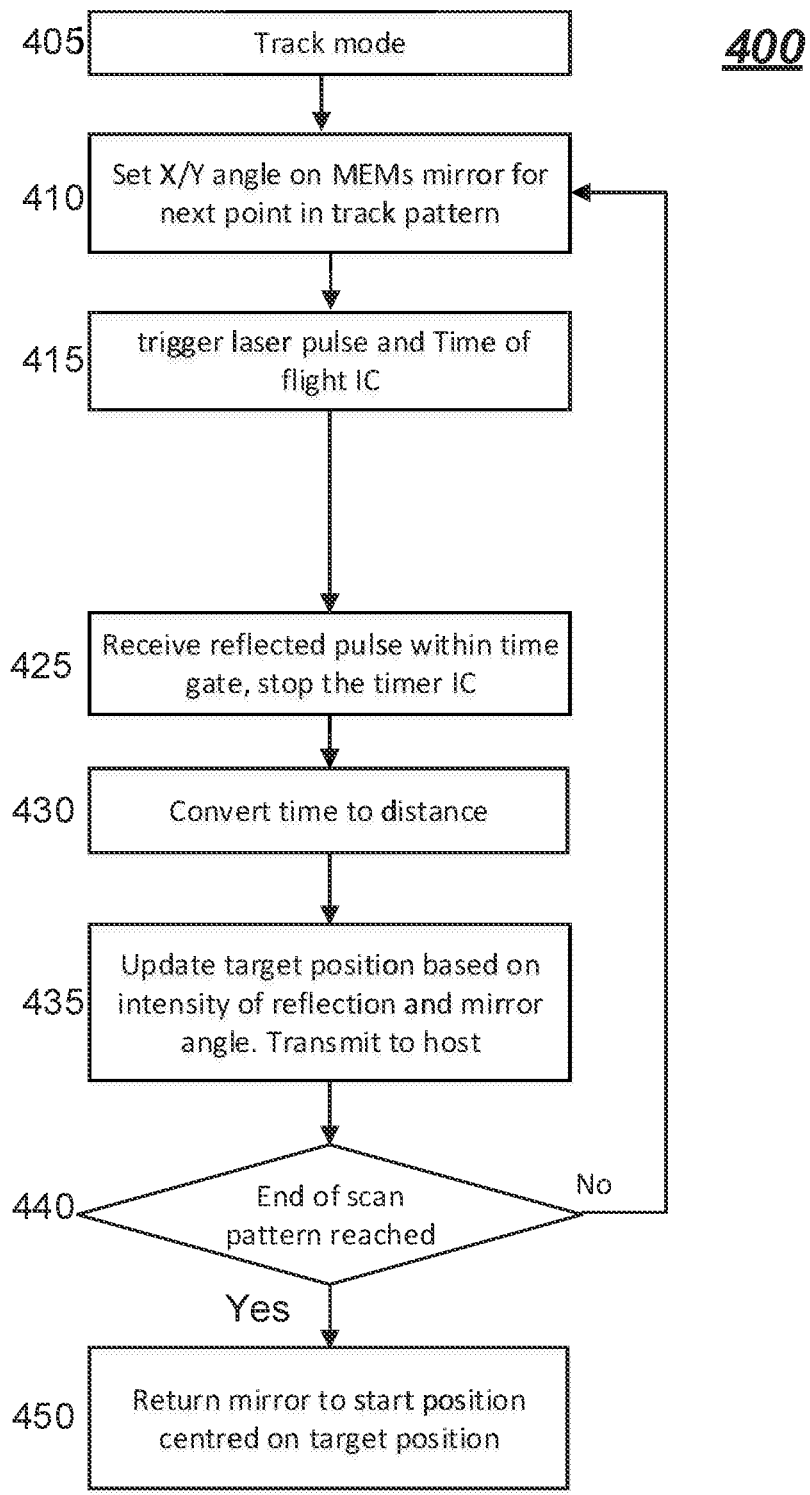
FIG. 11 shows a track mode process that can be performed by a T-LRF device, constructed according to the principles of the disclosure.

As noted above, the controller 100 can be arranged to operate in any of, for example, three modes, including a laser rangefinder mode (LRF), a search mode or a tracking mode. FIGS. 9, 10 and 11 show non-limiting embodiments of a laser rangefinder (LRF) mode process 200, a search mode process 300 and a tracking mode process 400, respectively, that can be performed by the controller 100. The controller 100 can include a computer-readable medium, which can be contained in, for example, the storage in the processor 105. The computer-readable medium can include a computing resource that, when executed by the processor 105, can perform each of the steps depicted in FIGS. 9-11. The computing resource can include a section of code or computer instruction that can cause the processor 105 to carry at each step in the process 200, 300 or 400.

FIG. 9 shows a non-limiting embodiment of the LRF mode process 200 that can begin when the processor 105 is set to the LRF mode (Step 210). Referring to FIG. 9, together with FIG. 2, 5 or 8, in response to an angle demanded by the host system (not shown), an X/Y angle can be set for the fast-scan mirror (FSM) 10 (Step 220) and the laser source 10 (or 10A, 10B) triggered to emit a laser pulse (Step 230). At the same time the laser pulse is triggered, a time of flight can be triggered on the processor 105 (or TDC 160) (Step 230). When the laser pulse impinges on an object in the field of view, the laser pulse can be reflected back to the T-LRF device 1 and detected by the DPR 60 (Step 250). Upon receiving the reflected laser pulse signal, the timer can be stopped, for example, after receiving the pulse signal in a time gate. Based on the timer value, the distance travelled by the laser pulse can be calculated to determine the distance to the object (Step 260). The mirror angle, range and intensity can also be determined on the basis of the received laser pulse, which can then be transmitted to the host system (not shown).

As seen in FIG. 9, the range from any arbitrary bearing within the field of view of the T-LRF device 1 can be found. This can be done via a single pulse or a series of pulses for every reading to average/process and improve range and accuracy.

FIG. 10 shows a non-limiting embodiment of the search mode process 300 that can begin when the processor 105 is set to the search mode (Step 305). The controller 100 and, in particular the processor 105, can be configured to have the search mode as a first mode by which the range from any arbitrary bearing within the field of view of the T-LRF device 1 can be determined. This can be done via a single laser pulse, or a series of pulses for every reading to average, process and improve range and accuracy.

Referring to FIG. 10, together with FIG. 2, 5 or 8, once operational in the search mode, the controller can sample background lighting noise, set a threshold value and filter (Step 310). The X/Y angle for the FSM 40 can be set for the next point in the scan pattern (for example, raster scan pattern, Lissajous pattern, an outward spiraling pattern, an inward spiraling pattern) (Step 315) and the laser source 10 (or 10A, 10B) triggered to emit a laser pulse signal (Step 320). At the same time, the time of a time counter can be triggered, such as, for example, a time of flight integrated circuit (IC). Any objects within the field of view of the T-LRF device 1 can be impinged, thereby reflecting the laser pulse back to the device where it is received and detected by the DPR 60 (Step 325). The reflected laser pulse can be received, for example, within the time gate and the timer stopped. The received, reflected laser pulse can be measured and the timer value converted to a distance value for the distance to the object (Step 330). The intensity and the X/Y angle of the FSM 40 can be determined and transmitted to the host system (not shown) (Step 330).

A determination can be made whether the range, angle and intensity parameters for the reflected laser pulse match those of the outgoing laser pulse (Step 335). A match can be determined if the range, angle or intensity parameters of the received laser pulse are within a predetermined threshold value of the range, angle or intensity parameters of the outgoing laser pulse. The threshold value can be set to take into account, for example, the distance between optics 50 and LC optics 70 (shown in FIG. 1), as well as manufacturing tolerances between the laser emitting components and reflected laser receiving components of the T-LRF device 1.

If a match is determined (YES at Step 335), then the controller 100 can switch to the tracking mode (Step 340), otherwise (NO at Step 335) a determination can be made whether the end of the scan pattern is reached (Step 345). If the end of the scan pattern is reached (YES at Step 345), then the FSM 40 can be returned to the start position (Step 350) and sampling, threshold value setting and filtering carried out (Step 310). If, however, the end of the scan pattern is not reached (NO at Step 345), then the X/Y angle of the FSM 40 can be set for the next point in the scan pattern (Step 315).

The process 300 can be carried out by the controller 100 to scan the laser over an area in the field of view. The process 300 can be optimized for searching for an object in the field of view, by for example selecting the optimal scanning pattern. The controller 100 can be arranged to the most probable bearing and range from the host system (not shown) and start by pointing according to the received bearing and range values. The controller can be arranged, for example, to begin spiraling at that point, spiraling away from the center in order to quickly acquire the target.

FIG. 11 shows a non-limiting embodiment of the tracking mode process 400 that can begin when the processor 105 is set to the tracking mode (Step 405). Referring to FIG. 11, together with FIG. 2, 5 or 8, once operational in the tracking mode, the controller 100 can set the X/Y angle on the FSM 40 for the next point in the track pattern (Step 410) and the laser source 10 (or 10A, 10B) triggered to emit a laser pulse (Step 415). At the same time, the time of a time counter can be triggered, such as, for example, a time of flight integrated circuit (IC). Any objects within the field of view of the T-LRF device 1 can be impinged, thereby reflecting the laser pulse back to the device where it is received and detected by the DPR 60 (Step 425). The reflected laser pulse can be received, for example, within the time gate and the timer stopped. The received, reflected laser pulse can be measured and the timer value converted to a distance value for the distance to the object (Step 430). The intensity and the X/Y angle of the FSM 40 can also be determined. The controller 100 can update the target position based on the intensity of the reflected laser pulse and X/Y angle of the FSM 40. This information can then be transmitted from the controller 100 to the host system (not shown) (Step 435).

A determination can be made whether the end of the scan pattern is reached (Step 440). If the end of the scan pattern is reached (YES at Step 440), then the FSM 40 can be returned to the start position (Step 450), otherwise (NO at Step 440) the X/Y angle of the FSM 40 can be set for the next point in the scan pattern (Step 410).

For each point in the scan pattern for the field of view, the T-LRF device 1 can be arranged to feed back to the host the bearing, detected range, and reflected intensity of any objects it detects above the ambient noise floor. The device 1 or, more particularly, the controller 100 can be arranged to compare this to the expected range to determine if the detected reflection is the desired target. Once a target is acquired the controller 100 can automatically switch to tracking mode.

In an embodiment, the controller 100 can be configured to calculate and transmit any combination of X, Y angular data, range data and intensity data to a host system (not shown) via an input output (10) interface, transmitter or transceiver. The T-LRF device 1 can include a receiver, transmitter or transceiver. The T-LRF device 1 can include a modulator/demodulator or an encoder/decoder. The host can include, for example, unmanned aerial vehicle (UAV), self-driving vehicle, a robot or any other system that might benefit from implementation of the T-LRF technology.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" and "communication device," as used in this disclosure, mean any hardware, firmware, or software that can transmit or receive data packets, instruction signals, data signals or radio frequency signals over a communication link. The device can include a computer or a server. The device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more processes.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

The terms "time-of-flight sensor" or "ToF sensor," as used in this disclosure, can be used interchangeably with the terms "detector photoreceptor" or "DPR," unless stated or indicated otherwise by the context within which the term is used.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A tracker laser rangefinder for detecting, targeting, locating or tracking an object in real time in a field of view, comprising:
    a laser source arranged to generate and emit a laser at a first time in response to a laser trigger signal;
    a fast-scan mirror arranged to deflect and steer the laser to the object in a scan plane;
    a sensor arranged to receive a reflection of the laser from the object at a second time and output a return laser detection signal; and
    a controller arranged to receive the return laser detection signal and determine a first angle, a second angle and a range to the object,
    wherein the first angle and the second angle are based on a position of the fast-scan mirror,
    wherein the range of the object is calculated based on a period of time comprising the first time as a start time and the second time as a stop time, and
    wherein the controller is further arranged to generate amplitude and phase information from combining a reference signal and the return laser detection signal to maintain a lock between the fast-scan mirror and the object,
    wherein the controller comprises a lock-in amplifier that generates the amplitude and phase information from combining the reference signal and the return laser detection signal, and wherein the reference signal is based on sampling an output of a monitor photoreceptor or of the laser trigger signal.

2. The tracker laser rangefinder in claim 1, wherein the sensor comprises an Avalanche photodiode, a silicon photomultiplier, a photodiode, an array of sensors, or a photomultiplier tube.

3. The tracker laser rangefinder in claim 1, wherein the sensor comprises a quadrant Avalanche photodiode or an IaGaAs Avalanche photodiode.

4. The tracker laser rangefinder in claim 1, wherein the fast-scan mirror comprises a microelectromechanical system (MEMS) device, a voice coil mirror (VCM) or a piezoelectric actuator mirror.

5. The tracker laser rangefinder in claim 1, further comprising a digital signal processor (DSP) arranged to:
    filter optical noise;
    filter electronic noise;
    reject a false positive signal;
    increase a signal-to-noise ratio of the reflection of the laser; or
    generate a time stamp for the reflection of the laser.

6. The tracker laser rangefinder in claim 1, wherein the fast-scan mirror and sensor are arranged to find and track in real time the object as it moves.

7. The tracker laser rangefinder in claim 1, further comprising:
    an optical system arranged to collect reflected light in the field of view, including the reflection of the laser from the object.

8. The tracker laser rangefinder in claim 7, wherein the optical system comprises at least one of a non-telecentric scan lens and an F-Theta lens.

9. The tracker laser rangefinder in claim 7, wherein the optical system is arranged to direct the laser to the object.

10. The tracker laser rangefinder in claim 7, further comprising a second optical system arranged to direct the laser to any point in the field of view.

11. The tracker laser rangefinder in claim 1, further comprising a return fast-scan mirror synchronized to the fast-scan mirror to lock-in and track a point in the scan plane.

12. The tracker laser rangefinder in claim 1, wherein the controller is arranged to output object location data to a host system, including a timestamp, the first angle, the second angle and the range to the object.

13. The tracker laser rangefinder in claim 12, wherein the controller is arranged to operate in any of a rangefinder mode, a search mode or a tracking mode.

\* \* \* \* \*